April 14, 1925.

E. WILSON

SUITCASE AND LUGGAGE HOLDER

Filed May 29, 1922

INVENTOR.
EMMET WILSON.

BY A.B.Bowman
ATTORNEY

Patented Apr. 14, 1925.

1,533,488

UNITED STATES PATENT OFFICE.

EMMET WILSON, OF CALEXICO, CALIFORNIA.

SUITCASE AND LUGGAGE HOLDER.

Application filed May 29, 1922. Serial No. 564,593.

*To all whom it may concern:*

Be it known that EMMET WILSON, a citizen of the United States, residing at Calexico, in the county of Imperial and State of California, has invented certain new and useful Suitcase and Luggage Holders, of which the following is a specification.

My invention relates to suitcase and luggage holders particularly adapted for vehicle running boards and the objects of my invention are: first, to provide holders of this class which will prevent suitcases or other luggage carried by the vehicle from scratching or marring the body of the vehicle: second, to provide suitcase or luggage holders of this class which can be readily secured to various parts of a vehicle where luggage is usually carried, for securing said luggage; third, to provide a device of this class in which the various holding elements are adjustable and shiftable with relation to each other for holding various sizes or a plurality of suitcases or various sizes of bundles or luggage; fourth, to provide a novelly constructed suitcase and luggage holder, and fifth, to provide a device of this class which is very simple and economical of construction, durable, efficient and which may be readily adjusted and secured to various parts of a vehicle and which will not readily deteriorate or get out of order.

Figure 1:
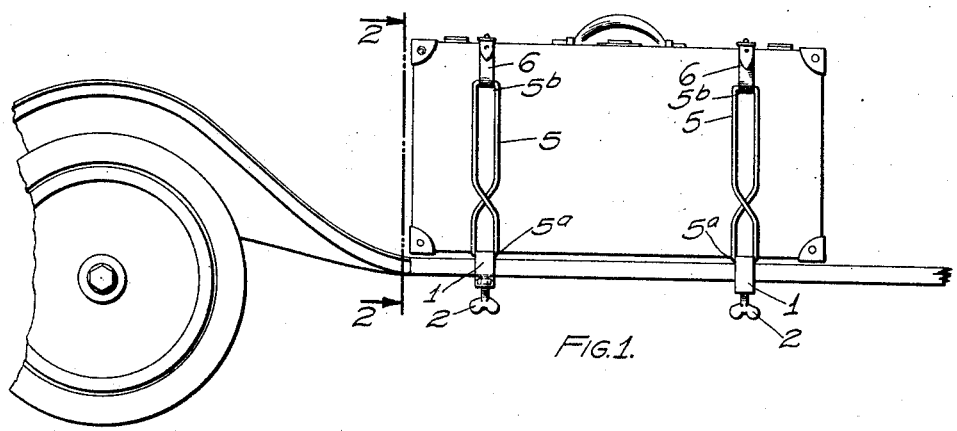
Figure 2:
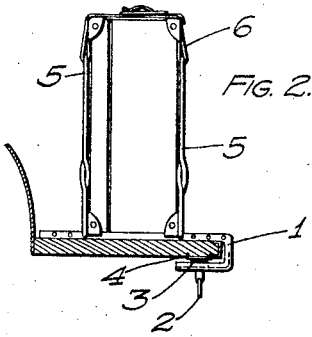
Figure 3:
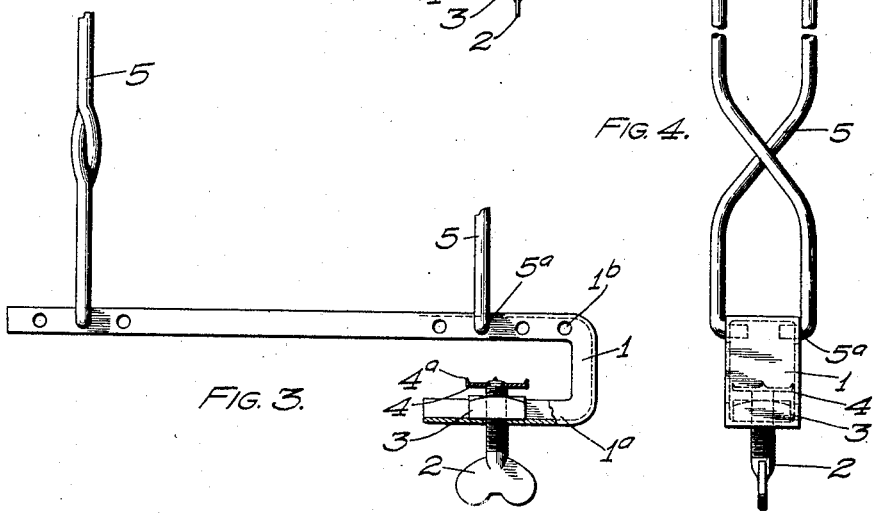
Figure 4:
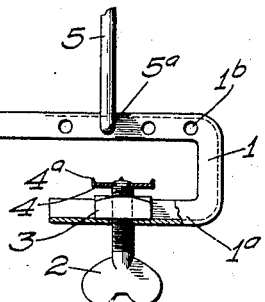

With these and other objects in view as will appear hereinafter my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a fragmentary side elevational view of an automobile with a pair of my suitcase and luggage holders secured to the running board thereof and holding a suitcase in upright position between the arm members of the same; Fig. 2 is an end elevational view thereof taken at 2—2 of Fig. 1. Fig. 3 is a fragmentary enlarged elevational view similar to that of Fig. 2 independent of the running board of the vehicle and the suitcases and with portions broken away and in section to facilitate the illustration, and Fig. 4 is another enlarged fragmentary view thereof taken at right angles to that of Fig. 3.

Like characters of reference refer to similar parts and portions throughout the several views of the drawings.

The clamp member 1, wing screw 2, nut 3, disc 4, luggage retaining members 5 and the strap 6 constitute the principal parts and portions of my suitcase and luggage holder.

The clamp member 1 is preferably made of light structural channel and is also preferably J-shaped with the flanges of the channel extending toward each other. Said clamp member is adapted to fit over the running board of the vehicle with the short leg 1ª of said clamp member extending under the running board, as shown best in Figs. 1 and 2 of the drawings. A wing screw 2 is provided in the short leg 1ª of the clamp member 1 adapted to secure said clamp on the running board of the vehicle. A nut 3 is provided between the flanges of the channel at the short leg 1ª of the clamp member 1 so as to provide sufficient threads for the wing nut 2 when clamped against the running board. A disc 4 provided with prongs 4ª is revolubly mounted at the end of the threaded portion of the wing nut 2 so as to securely position said clamp member 1 on the running board or other portions of the vehicle. The member 1 is also provided with a plurality of oppositely disposed holes 1ᵇ in the flanges in the long legs thereof adapted to receive the lugs 5ª of the resilient luggage retaining members 5. The members 5 are preferably crossed and shaped as shown in Figs. 1 and 4 of the drawings so that they may be readily compressed at their upper portion, disengaged and removed from the holes 1ᵇ of the member 1 and repositioned in any other set of oppositely disposed holes in said member. Thus it will be seen that the members 5 may be positioned at various distances from each other in the member 1 to suit the suitcases or luggage to be held by my holder. A strap 6 is adapted to pass through the loop portions 5ᵇ at the upper portions of the upright members 5 to secure the luggage between said members and also hold the luggage retaining members in position.

Though I have shown and described a particular construction, combination and arrangement of parts and portions I do not wish to be limited to this particular construction, combination and arrangement but desire to include in the scope of my invention the construction, combination and arrangement substantially as set forth in the appended claims.

It is obvious that with this device I have provided a suitcase and luggage holder which will prevent suitcases or luggage from scratching or marring the body of the vehicle; that I have provided a device of this class which may be secured to the various parts of a vehicle where luggage is usually carried; that I have provided a device of this class which may be readily adjusted to suit and hold various sizes of suitcases, bundles or luggage, and also that I have provided a device which is novel, very simple and economical of construction, durable, efficient and which will not readily deteriorate or get out of order.

Having thus described my invention what I claim as new and desire to secure by Letters Patent is:

1. In a luggage carrier, a clamp member adapted to be secured to the running board of a vehicle and provided in the sides thereof with a plurality of spaced oppositely disposed holes, means for securing said clamp member to said running board, resilient luggage positioning members formed of flexible metal rods twisted so that the portions from one side of the normally outer ends extend to the opposite sides thereof at their normally inner ends, providing inherent resilient clamp means, the ends of the portions extending over to the opposite side of the inner ends of the members being provided with inwardly extending lugs adapted to extend into the spaced oppositely disposed holes of said clamp member and pivotally support the same thereon, and a strap adapted to extend through the loop portions at the free ends of the luggage positioning members for retaining luggage therebetween.

2. In a luggage carrier, a clamp member adapted to be secured to the running board of a vehicle and provided in the sides thereof with a plurality of spaced apart, oppositely disposed holes, means for securing said clamp member to said running board, resilient, laterally expansible luggage positioning members formed of flexible metal rods and provided at their inner ends with inwardly extending, oppositely disposed lugs adapted to extend into the spaced apart, oppositely disposed holes of said clamp member and pivotally support said luggage positioning members thereon, and means adapted to connect the free ends of the luggage positioning members for supporting the same at their free ends and retaining luggage therebetween.

In testimony whereof, I have hereunto set my hand at San Diego, California, this 22nd day of May, 1922.

EMMET WILSON.